Figure 1:
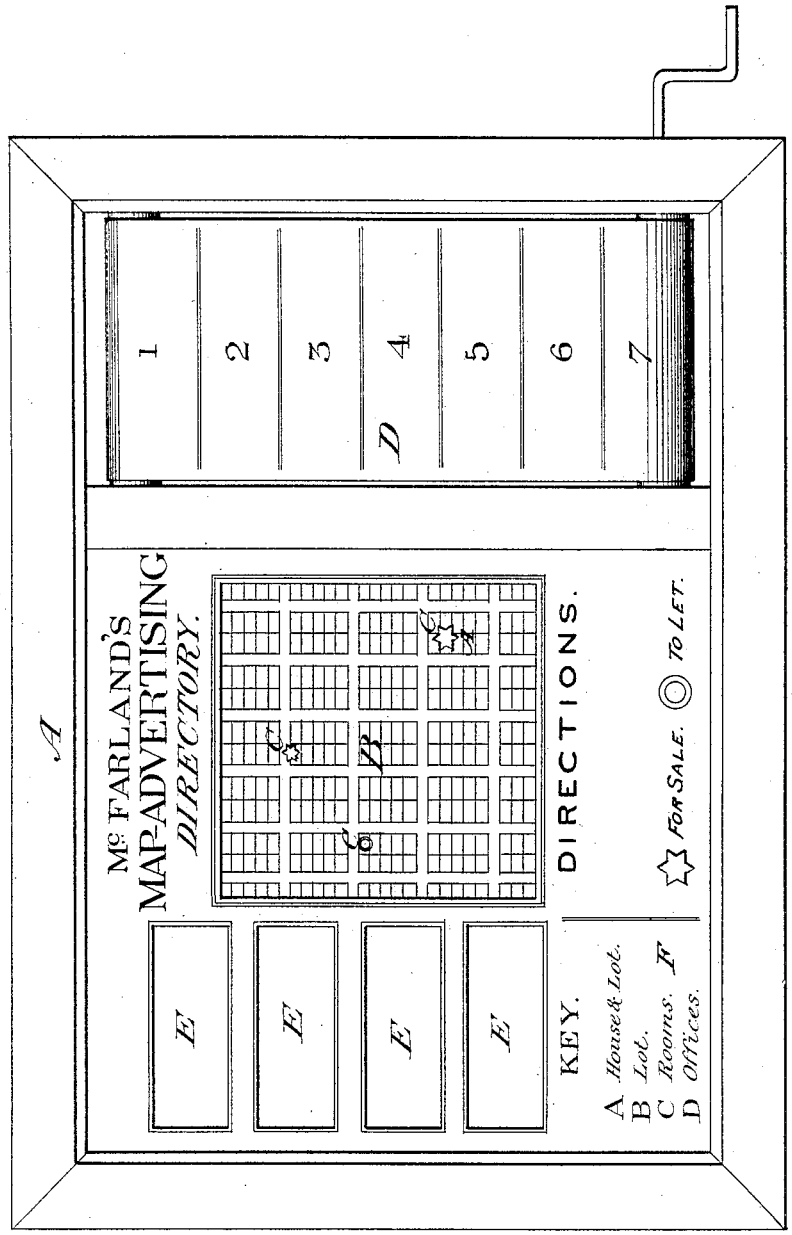

J. D. McFARLAND.
Advertising Device.

No. 209,352. Patented Oct. 29, 1878.

Attest:
Jas. B. Milles
H. W. Rich

Inventor.
John D. McFarland
by Jno K Hallock
atty

UNITED STATES PATENT OFFICE.

JOHN D. McFARLAND, OF ERIE, ASSIGNOR TO MILTON STEWART, OF TITUSVILLE, PENNSYLVANIA.

IMPROVEMENT IN ADVERTISING DEVICES.

Specification forming part of Letters Patent No. 209,352, dated October 29, 1878; application filed February 11, 1878.

*To all whom it may concern:*

Be it known that I, JOHN D. McFARLAND, of Erie, in the county of Erie and State of Pennsylvania, have invented a new and useful Device for Advertising; and I do hereby declare the following to be a full, clear, and exact description thereof.

My invention consists in combining with a map—as, for example, a map of a city—devices for indicating on said map positions at which property is for sale, or for rent, or at which something is wanted; and the further combination with said map and said indicating devices of other means for explaining what kind of property is for sale or rent, or what particular thing is wanted, and also where or of whom the observer may inquire for further particulars.

My invention may also be used for indicating on said map by said devices positions at which anything is occurring or has or will occur; and also for other purposes not necessary to enumerate.

The devices by which I indicate the positions desired on said map are pointed instruments—as, for example, a tack or a pin. In connection with said tacks or pins I use a head on the same, said head being fixed or adjustable, and bearing a certain color or shape, or number, or combination of shapes, colors, and numbers, or combination of colors and shapes, colors, and numbers, numbers and shapes, or either or all of them; or any other indicating devices or forms may be attached to said tacks or pins.

When my device is used for advertising real estate for sale or rent, these tacks are stuck into the map at the point where the real estate is located. The color of the head of the tack, or its shape or number, or either or all, or any combination thereof, will refer the observer to a marginal card from which he will derive further information.

The form, color, or shape of the head of the tack, or something connected with said tack, will indicate to the observer whether the property indicated is for sale or rent, or rooms to rent, &c. Various combinations, almost infinite in number, may be had with my device.

I am aware that in maps used by the United States Government Signal Service there are, at certain points in said maps, eyelets or studs affixed, to which disks are attachable to show any meteoric condition; but such a device would not serve the purpose of my invention, for the indicating-disks in that case can only be attached at such points as are provided with eyelets or studs.

In my device, by using the pointed tack or pin I can make the attachment to the map at any point desired, and that, too, without injuring the face of the map. Again, in the map used by the Government Signal Service the marginal references are fixed, while in my device the same are changeable at pleasure without injuring the appearance of the device by erasure or otherwise.

Figures 2, 3:
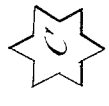

In the accompanying drawing my device or invention is shown, as follows: Figure 1 is a front view of the case and inclosed map and register or description cards. Fig. 2 is a side view of one of the tacks, and Fig. 3 is a top view of the head of the tack.

A is the case, and is provided with a glass front. B is the map. C C C are indicating-tacks. D is an endless belt, running over rollers and operated by a crank. On this belt are numbered spaces, or spaces which are designated by any other means, as letters or colors. E E, &c., are cards in the margin. F is an explanatory key and accompanying directions.

The operation is as follows: Take, for instance, the star-head tack; we will suppose it to be red. On it is the letter A and the figure 1. By looking in the key we see that a star means "for sale;" the letter A means "house and lot;" the number 1 refers to a space in the register-belt of that number, where a sufficiently full description of the property is attached. The card on which this description is may be of the same color as the tack-head, if desired, and may be fixed or adjustable; but the card in the margin E is intended to be of the same color, (red,) and the observer, by looking there, will find the address of the advertiser, owner, or agent of the property. The map and the marginal spaces and cards may be used without the revolving register, and the map and the revolving register may be used without the marginal cards. The register may be stationary, if desired. The marginal cards E E E are made removable, so that any change desired can be made.

What I claim as my invention, and desire to secure by Letters Patent, is—

An advertising device consisting of a map, B, marginal spaces adapted for receiving cards with addresses or descriptive matter, and pointed instruments, bearing symbols or insignia, to be inserted in said map at any desired point, whereby the observer is directed from the location on the map pointed out by the instrument to the proper card for information relating to said location, substantially as and for the purposes herein set forth.

In testimony whereof I, the said JOHN D. McFARLAND, have hereunto set my hand.

JOHN D. McFARLAND.

Witnesses:
JNO. K. HALLOCK,
JAS. S. MILLER.